(12) United States Patent
Dwyer

(10) Patent No.: US 10,570,869 B2
(45) Date of Patent: Feb. 25, 2020

(54) IGNITION SYSTEM WITH SINGLE ACTION START FAULT CORRECTION

(71) Applicant: HUSQVARNA AB, Huskvarna (SE)

(72) Inventor: Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/536,025

(22) PCT Filed: Nov. 2, 2015

(86) PCT No.: PCT/IB2015/058474
§ 371 (c)(1),
(2) Date: Jun. 14, 2017

(87) PCT Pub. No.: WO2016/097893
PCT Pub. Date: Jun. 23, 2016

(65) Prior Publication Data
US 2017/0335818 A1 Nov. 23, 2017

Related U.S. Application Data

(60) Provisional application No. 62/094,961, filed on Dec. 20, 2014.

(51) Int. Cl.
*F02N 11/10* (2006.01)
*F02N 11/08* (2006.01)
(Continued)

(52) U.S. Cl.
CPC ............ *F02N 11/101* (2013.01); *A01D 34/64* (2013.01); *A01D 34/68* (2013.01); *F02N 11/084* (2013.01);
(Continued)

(58) Field of Classification Search
CPC .... F02N 11/101; F02N 11/103; F02N 11/105; F02N 11/0833; F02N 11/084;
(Continued)

(56) References Cited

U.S. PATENT DOCUMENTS 2,900,970 A * 8/1959 Sims ...................... F02N 15/04
7/49
4,671,395 A * 6/1987 Dobberpuhl ....... A01D 34/6806
192/17 C
(Continued)

FOREIGN PATENT DOCUMENTS

DE 102010023807 A1 12/2011
WO 2010051409 A1 5/2010
(Continued)

OTHER PUBLICATIONS

International Search Report and Written Opinion for International Application No. PCT/IB2015/058474 dated Jan. 18, 2016.
(Continued)

*Primary Examiner* — Kevin R Steckbauer
(74) *Attorney, Agent, or Firm* — Burr & Forman, LLP

(57) ABSTRACT

A method of enabling operation of an ignition system for outdoor power equipment may include monitoring status of a plurality of switches associated with respective components of the equipment where at least one of the respective components corresponds to one or more binary start fault operators, and setting a start enabling status for the one or more 5 binary start fault operators responsive to actuation of a start fault clearance operator.

17 Claims, 5 Drawing Sheets

(51) Int. Cl.
  *A01D 34/64*  (2006.01)
  *A01D 34/68*  (2006.01)
  *A01D 34/74*  (2006.01)
  *A01D 43/063*  (2006.01)
  *A01D 101/00*  (2006.01)

(52) U.S. Cl.
  CPC ........ *F02N 11/0833* (2013.01); *F02N 11/103* (2013.01); *A01D 34/74* (2013.01); *A01D 43/063* (2013.01); *A01D 2101/00* (2013.01); *F02N 2200/08* (2013.01); *F02N 2200/0802* (2013.01); *F02N 2200/0803* (2013.01); *F02N 2200/0807* (2013.01); *F02N 2200/0809* (2013.01); *F02N 2200/0812* (2013.01)

(58) Field of Classification Search
  CPC ......... F02N 2200/08; F02N 2200/0802; F02N 2200/0803; F02N 2200/0807; F02N 2200/0812
  See application file for complete search history.

(56) References Cited

U.S. PATENT DOCUMENTS

| | | | |
|---|---|---|---|
| 6,609,357 B1 * | 8/2003 | Davis | A01D 34/006 56/10.2 A |
| 7,061,368 B2 | 6/2006 | Okada | |
| 9,038,490 B2 * | 5/2015 | Huebner | B60K 25/06 74/15.82 |
| 9,446,705 B2 * | 9/2016 | Dwyer | A01D 34/6818 |
| 9,668,405 B2 * | 6/2017 | Albinger | A01D 34/828 |
| 9,679,419 B2 * | 6/2017 | Dwyer | B60K 35/00 |
| D794,085 S * | 8/2017 | Tse | A01D 34/828 D15/17 |
| 9,950,621 B2 * | 4/2018 | Dwyer | B60K 35/00 |
| 2003/0058087 A1 | 3/2003 | Wenzel et al. | |
| 2004/0050026 A1 * | 3/2004 | Stover | A01D 69/10 56/11.3 |
| 2014/0069216 A1 * | 3/2014 | Huebner | B60K 25/06 74/15.82 |
| 2014/0266659 A1 * | 9/2014 | Dwyer | A01D 34/6818 340/438 |
| 2014/0266664 A1 * | 9/2014 | Dwyer | B60K 35/00 340/459 |
| 2015/0296706 A1 * | 10/2015 | Albinger | A01D 34/828 56/10.5 |
| 2016/0153166 A1 * | 6/2016 | Gentle | E02F 3/844 172/781 |
| 2016/0355186 A1 * | 12/2016 | Kanitz | B62D 1/187 |
| 2017/0225569 A1 * | 8/2017 | Dwyer | B60K 35/00 |

FOREIGN PATENT DOCUMENTS

| | | | |
|---|---|---|---|
| WO | 2013062574 A1 | 5/2013 | |
| WO | 2014062176 A1 | 4/2014 | |
| WO | WO-2014062176 A1 * | 4/2014 | .......... A01D 34/828 |
| WO | 2015087297 A1 | 6/2015 | |

OTHER PUBLICATIONS

International Preliminary Report on Patentability for International Application No. PCT/IB2015/058474 dated Jun. 20, 2017.

* cited by examiner

IGNITION SYSTEM WITH SINGLE ACTION START FAULT CORRECTION

CROSS REFERENCE TO RELATED APPLICATIONS

The present application claims priority to U.S. patent application No. 62/094,961 filed Dec. 20, 2014, which is expressly incorporated by reference in its entirety.

TECHNICAL FIELD

Example embodiments generally relate to outdoor power equipment and, more particularly, some embodiments relate to an ignition system that can correct start faults via a single action for outdoor power equipment.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers and riding lawn mowers, such as lawn tractors, are some examples of such equipment. Other outdoor power equipment such as snow blowers, tillers, trimmers, chainsaws and/or the like are also tailored to do specific tasks and may also have different models with corresponding different features for matching the needs and budgets of consumers.

Ignition systems for many handheld or walk behind outdoor power equipment devices have often been based on a recoil start (or pull start). In such a device, a rope with a grip at the end is coiled around a mechanism that is coupled to an end of the crankshaft. When the rope is pulled to cause uncoiling, the crankshaft spins to crank the engine. Newer pieces of outdoor power equipment are starting to employ electric starters. Electric starters generally include an electric starting motor (or starter motor) that requires battery power for operation. A common electric starter may include a starter solenoid. A key operated switch is typically used to apply battery power to the solenoid. Application of power to the solenoid through the key operated switch closes high current contacts for the starter motor to cause it to turn for a limited period of time to start the engine.

Although the use of a key operated switch is relatively familiar to many users, it represents a relatively limited user interface. Thus, more modern user interfaces for outdoor power equipment starting may be developed. These modern user interfaces may be expected to have a number of switches and/or buttons that may provide additional functionality that had not previously been possible to deliver, but may also introduce new challenges.

BRIEF SUMMARY OF SOME EXAMPLES

Some example embodiments may provide an electronic ignition system for employment, for example, with riding lawn care equipment or other outdoor power equipment. The electronic ignition starting system may enable starting of the engine based on proper positioning of a number of switches, buttons or other operators that may relate to various respective conditions or systems of the equipment. Some example embodiments may improve the ability of operators to operate outdoor power equipment by allowing a number of different potential start faults associated with these operators to be cured with a single action. Operators may therefore take fuller advantage of the capabilities of their outdoor power equipment devices, while such devices operate more safely and effectively, and thus the operators may have a greater satisfaction with the performance of their outdoor power equipment devices.

In an example embodiment, a method of enabling operation of an ignition system for outdoor power equipment is provided. The method may include monitoring status of a plurality of switches associated with respective components of the equipment where at least one of the respective components corresponds to one or more binary start fault operators, and setting a start enabling status for the one or more binary start fault operators responsive to actuation of a start fault clearance operator.

In another example embodiment, outdoor power equipment is provided. The equipment may include an engine to selectively power the equipment, an ignition system, a switch monitoring assembly and a start fault clearance operator. The ignition system may include a processor to enable selective powering of the engine based at least in part on a position of one or more binary start fault operators. The switch monitoring assembly may be configured to enable the processor to monitor status of a plurality of switches associated with respective components of the equipment. At least one of the respective components may correspond to the one or more binary start fault operators. The start fault clearance operator may be configured to set a start enabling status for the one or more binary start fault operators responsive to actuation of the start fault clearance operator.

In another example embodiment, ignition system for outdoor power equipment is provided. The ignition system may include an engine to selectively power the equipment. The ignition system may include a processor to enable selective powering of the engine based at least in part on a position of one or more binary start fault operators, a switch monitoring assembly, and a start fault clearance operator. The switch monitoring assembly may be configured to enable the processor to monitor status of a plurality of switches associated with respective components of the equipment. At least one of the respective components may correspond to the one or more binary start fault operators. The start fault clearance operator may be configured to set a start enabling status for the one or more binary start fault operators responsive to actuation of the start fault clearance operator.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
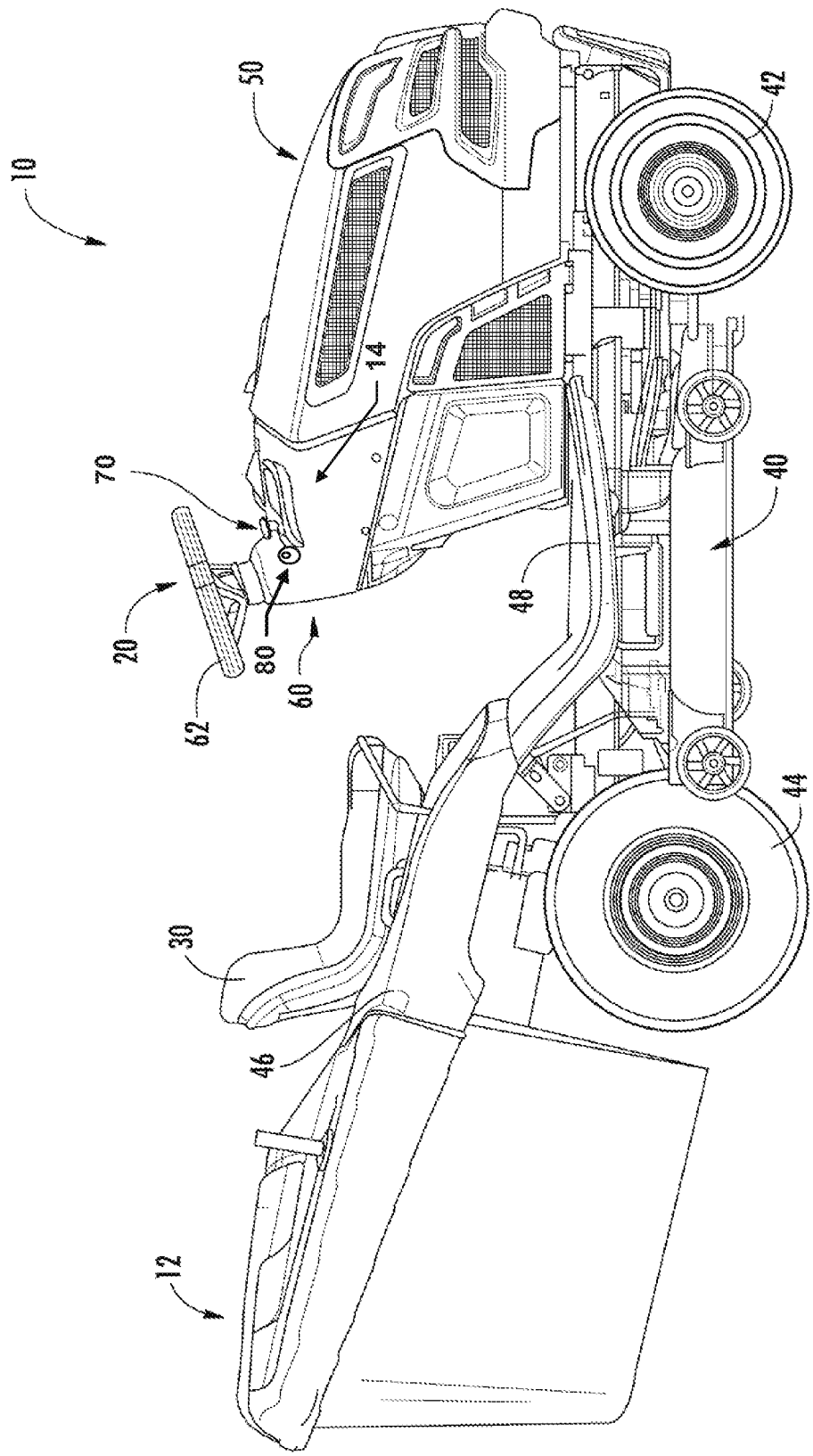
FIG. 1 illustrates a perspective view of the riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

When a microprocessor is introduced into an ignition interface, the potential for employing additional functionality into the control and monitoring capabilities associated with the ignition interface may be increased. For example, by providing a number of sensor and/or safety switch inputs to the microprocessor, the corresponding inputs may be monitored to try to determine certain situations for which intervention or other functional activity may be desired. However, for a typical monitoring system configured to monitor the states of various components having two states (e.g., on/off, engaged/disengaged, powered/unpowered, normal/fault, etc.), the system is set up to detect whether the states of such components are allowable states to enable the engine to be started. If one or more of the monitored components is not in an allowable state for enabling starting of the engine, engine starting may be prevented and the condition may be considered to be a start fault.

In a typical case, the user will be informed if there is a start fault, and the user will not only be prevented from starting the engine, but will also know that he/she must try to clear the start fault before starting the engine. For relatively primitive user interfaces, the user may need to check every possible start fault that comes to mind and then try again to start the engine. For more complex user interfaces, it may be possible to monitor start fault conditions and indicate to the user which particular start fault is causing the issue. For example, if starting the engine requires that the parking break be set, a start fault indicator may further inform the user that the start fault experienced is related to the parking break. The user may then set the parking break and try again to start the engine.

Although monitoring component states may allow the user to be informed of the presence of a start fault, and potentially even the identity of the particular start fault (or start faults) that is (are) present, it can still be a guessing game and/or annoyance for users to continue to try to start the engine only to be subsequently prevented by virtue of a series of start faults that may be encountered. Accordingly, some example embodiments may provide a single action that may be used to automatically fix all start fault conditions that prevent ignition (or at least all start fault conditions that are related to a single switch, button or operator position (e.g., binary start fault operators)). In this regard, for example, some example embodiments may employ a start fault clearance operator. The start fault clearance operator may be a key, button, switch, lever or other such operator that, responsive to actuation thereof, places every binary start fault operator to which the start fault clearance operator is connected into an enabling state (i.e., out of its corresponding start fault condition state). Thus, for example, switches, buttons or other such operators that are binary start fault operators can be repositioned responsive to operation of the start fault clearance operator.

Of note, the term binary start fault operator does not necessarily imply that such operators have only two positions, but instead should be understood to correspond to operators that, regardless of the number of positions in which they can be placed, are either in an enabling state (in one or more of the possible positions) or in a start fault condition state (in every other possible position).

FIG. 1 illustrates an example lawn care device in the form of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an operations panel 14 that may display operational information regarding the riding lawn care vehicle 10 and host various controls, gauges, switches, displays, and/or the like. As shown and described herein, the riding lawn care vehicle 10 may be a riding lawn mower (e.g., a lawn tractor, front-mount riding lawn mower, riding lawn mower with a zero or near zero degree radius of turn, cross mower, stand-on riding lawn mower, and/or the like). However, other example embodiments may be employed on other outdoor power equipment devices, such as walk behind lawn mowers, tillers, snow throwers, and/or the like.

The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear, or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases, the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments, the shafts are coupled to a motor via a system of belts and pulleys. In other embodiments, the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control-related components such as one or more speed controllers, brakes, cutting height adjusters, and/or the like. Some of the controllers, such as the speed controllers and/or brakes, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

In an example embodiment, the engine 50 may turn at least one shaft that is coupled to corresponding ones of one or more cutting blades within the cutting deck 40 via a PTO clutch. When the PTO clutch is engaged, rotary power generated by the engine 50 may be coupled to the one or more cutting blades to cause rotation thereof (e.g., for cutting grass). When the PTO clutch is disengaged, rotary power generated by the engine 50 may not be coupled to the one or more cutting blades and thus the cutting blades may not rotate. In some embodiments, engagement of the PTO clutch may be accomplished via operation of a PTO switch 70 that may be disposed on or proximate to the operations panel 14. The PTO switch 70 may, in some cases, return to the same location regardless of whether it is activated or not, and may indicate its current state via a light or other indication rather than by virtue of its position (e.g., extended or retracted). This means that, for example, the PTO switch 70 can be actuated electronically since there is no need to physically interact with the PTO switch 70 to change its physical position to conduct a state change. This is one example of a binary start fault operator that can be manipulated by an example embodiment. In this regard, for some binary start fault operators, the corresponding switch, button and/or the like may be actuated independent of a physical position of the corresponding operators. Thus, microprocessor monitoring and control of the switch states associated with the corresponding operators may be achieved without any need to physically reposition such switches.

The operations panel 14, or some other portion of the steering assembly housing 60, may also provide support for an ignition interface 80 of an example embodiment. The ignition interface 80 may be used for starting the engine 50 and for controlling other functions of the riding lawn care vehicle 10. In an example embodiment, the ignition interface 80 may not require a key to operate. Thus, the operator of the riding lawn care vehicle 10 may be enabled to start and/or initiate one or more functional capabilities of the riding lawn care vehicle 10 without the use of a physical key.

Figure 2:
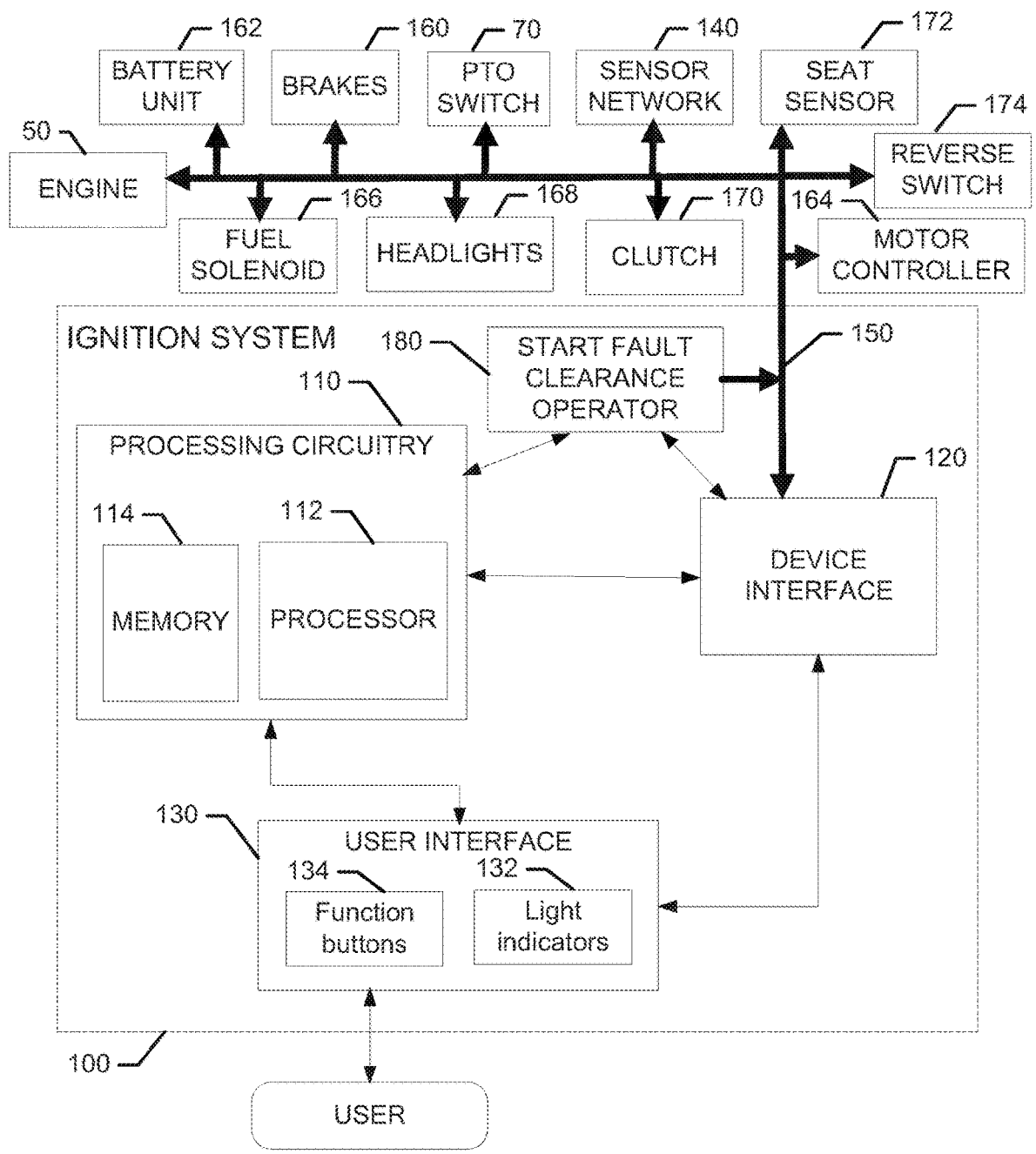
FIG. 2 illustrates a functional block diagram for explaining the operation of an ignition system of an example embodiment.

FIG. 2 illustrates a functional block diagram for explaining the operation of an ignition system 100 of an example embodiment. As shown in FIG. 2, the ignition system 100 may include processing circuitry 110 to control starting of the engine 50 of the riding lawn care vehicle 10 of an example embodiment as described herein. In this regard, for example, the ignition system 100 may utilize the processing circuitry 110 to provide electronic control inputs to one or more functional units of the riding lawn care vehicle 10 and to process data generated by the one or more functional units regarding various operational parameters relating to the riding lawn care vehicle 10. The processing circuitry 110 may be configured to perform data processing, control function execution, and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software, or a combination of hardware and software) to perform operations described herein. However, in some embodiments, the processing circuitry 110 may be embodied as a portion of an on-board computer. In some embodiments, the processing circuitry 110 may communicate with electronic components and/or sensors of a sensor network 140 (e.g., sensors that measure variable values related to riding lawn care vehicle parameters) of the riding lawn care vehicle 10 via a single data bus (e.g., data bus 150), which may form a portion of the device interface 120 or which may connect to the device interface 120. As such, the data bus 150 may connect to a plurality or all of the sensors, switching components, and/or other electrically-controlled components of the riding lawn care vehicle 10 to the processing circuitry 110.

In an example embodiment, the data bus 150 may further provide a mechanism by which the processing circuitry 110 can interface with or control other functional units of the riding lawn care vehicle 10. For example, in some embodiments, the data bus 150 may provide control inputs to and/or receive status inputs from functional units such as any or all of the engine 50, PTO switch 70, brakes 160 (which may include a parking brake), a battery unit 162, one or more motor controllers 164, a fuel solenoid 166, headlights 168, clutch 170, seat sensor 172, reverse switch 174, and/or the like.

The user interface 130 may be in communication with the processing circuitry 110 to receive an indication of a user input at the user interface 130 and/or to provide an audible, visual, mechanical, or other output to the user. As such, the user interface 130 may include, for example, a display, one or more levers, switches, buttons or keys (e.g., function buttons), and/or other input/output mechanisms. In an example embodiment, the user interface 130 includes the ignition interface 80, which may further include a plurality of light indicators 132 and a plurality of function buttons 134 that will be described in greater detail below.

The light indicators 132 may be LEDs or LED backlit images that are lit or unlit to indicate corresponding status information. The information indicated by the light indicators 132 may be directly related to the corresponding function buttons 134 in some cases. However, in other cases, some of the light indicators 132 may indicate status information associated with other functional units (e.g., those connected to the data bus 150). Meanwhile, the function buttons 134 may be employed for initiation of various control operations to actuate or turn off corresponding ones of the functional units. However, in an example embodiment, the function buttons 134 may also have an alternative functionality associated with starting of the engine 50. In this regard, for example, the function buttons 134 may be used for the provision of a code that is required to start the engine 50. In an example embodiment, the function buttons 134 may include one button that functions as a start button that must be depressed or otherwise actuated in order to start the engine 50. However, the start button may not be enabled for operation to start the engine 50 until an unlocking code is entered via other ones of the function buttons 134. Thus, the function buttons 134 may include at least some code entry or unlocking buttons and a start button, and the start button may only be unlocked for starting responsive to entry of an unlocking code using the code entry or unlocking buttons. In some cases, one of the function buttons 134 may be a start fault clearance button, which may act as the user interface mechanism for a start fault clearance operator 180, which will be described in greater detail below. The start fault clearance operator 180 may be a part of or in communication with the ignition system 100 in some example embodiments.

The device interface 120 may include one or more interface mechanisms for enabling communication with other devices (e.g., sensors of the sensor network 140 and/or other accessories or functional units such as motors, engines, servos, switches, or other operational control devices for providing control functions). In some cases, the device interface 120 may be any means such as a device or circuitry embodied in either hardware, or a combination of hardware and software that is configured to receive and/or transmit data from/to sensors in communication with the processing circuitry 110 via the data bus 150. Thus, for example, the device interface 120 may provide interfaces for communication of components of the riding lawn care vehicle 10 via the data bus 150.

The processor 112 may be embodied in a number of different ways. For example, the processor 112 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA, or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include, or otherwise control the operation of the ignition system 100 based on inputs received by the processing circuitry 110 responsive to positioning of the function buttons 134 and/or the operation of various ones of the functional units. As such, in some embodiments, the processor 112 (or the processing circuitry 110) may be said to cause each of the operations described in connection with the ignition system 100 in relation to operation of the functional units and/or function buttons 134 to undertake the corresponding functionalities responsive to execution of instructions or algorithms configuring the processor 112 (or processing circuitry 110) accordingly. In an example embodiment, the processor 112 may be physically located within a body that houses the electronics for the ignition interface 80, and the processor 112 may be the processor for the entire riding lawn care vehicle 10. However, the processor 112 could be located in other areas, or portions could be distributed in various locations if the processor 112 is embodied in some form of distributed architecture.

In an exemplary embodiment, the memory 114 may include one or more non-transitory memory devices such as, for example, volatile and/or non-volatile memory that may be either fixed or removable. The memory 114 may be configured to store information, data, applications, instructions, or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 110, functional units, and/or the function buttons 134. Among the contents of the memory 114, applications may be stored for execution by the processor 112 in order to carry out the functionality associated with each respective application. In some cases, the applications may include instructions for recognition of various switch or operator positions related to engine ignition (e.g., binary start fault operator status) as described herein, and instructions for placement of binary start fault operators into a start enabling status responsive to actuation of the start fault clearance operator 180.

In an example embodiment, various ones of the functional units may impact each other. For example, the PTO switch 70 may be used to alter a position of the clutch 170. Likewise, the motor controller 164 (if employed) may impact the application of battery power from the battery unit 162 to either a drive motor or a cutting motor. The position of the fuel solenoid 166 may impact operation of the engine 50 by cutting off or allowing fuel to reach the engine 50 in embodiments where the engine 50 is a gasoline engine. Inputs regarding position of the brakes 160 and/or the PTO switch 70 may impact operation of the clutch 170, engine 50, and/or the like. Battery unit 162 status, status of the headlights 168, and/or other sensor network component status may be reported to and/or controlled by operation of the function buttons 134. Accordingly, it should be appreciated that the ignition system 100 of an example embodiment, and particularly the data bus 150 and the processing circuitry 110 may enable the user interface 130 to provide a relatively robust interface mechanism for controlling starter operation and numerous other functions of the riding lawn care vehicle 10.

Figure 3:
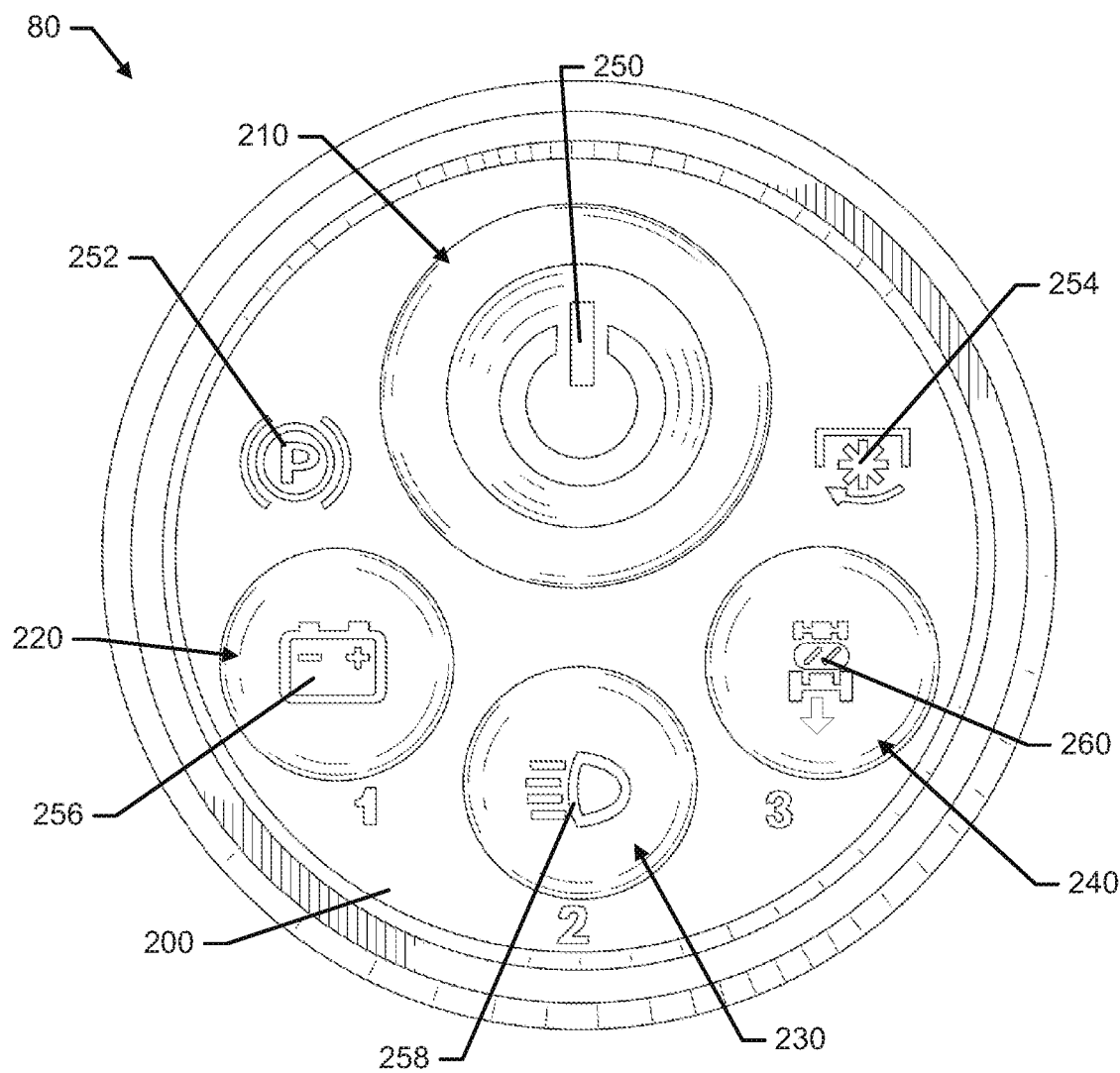
FIG. 3 illustrates a plan view of an arrangement of the ignition interface of an example embodiment.
Figure 3:
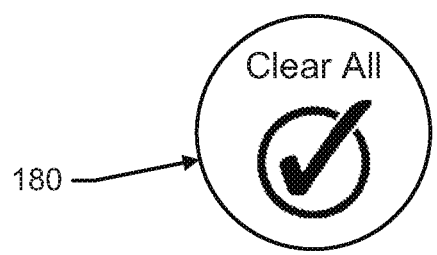

FIG. 3 illustrates a plan view of an arrangement of a portion of an operator panel including the ignition interface 80 and a button for the start fault clearance operator 180 of an example embodiment. In this regard, FIG. 3 illustrates an assembly which may include a housing in which circuitry of the ignition interface 80 may be housed, and the start fault clearance operator 180 be disposed proximate thereto. However, it should also be appreciated that the start fault clearance operator 180 could be part of the ignition interface 80 or disposed remote from the ignition interface 80 in other example embodiments. It should also be appreciated that the start fault clearance operator 180 could be provided in connection with other devices than a riding lawn mower (e.g., a walk-behind mower, chainsaw, blower, snow thrower, trimmer, edger, tiller, etc.), and other ignition interfaces for riding lawn mowers as long as the devices incorporate binary start fault operators. Thus, the examples described herein in relation to the riding lawn care vehicle 10 and its ignition interface 80 should be appreciated as merely examples of how one embodiment could be structured and implemented.

The housing may be plugged into a receptacle of the operations panel 14 to plug into a system of wiring and/or circuitry of the riding lawn care vehicle 10. As shown in FIG. 3, the ignition interface may include a panel face 200 onto which the light indicators 132 and the function buttons 134 are provided. In this example, the panel face 200 is round and includes raised buttons (i.e., the function buttons 134) provided thereon. Meanwhile, the light indicators 132 may be provided in the panel face 200 itself, or in one or more of the function buttons 134. The light indicators 132 may each be a single color or may have multiple potential colors. In some cases, the light indicators 132 may have variable intensity so that brightness may ramp up (or down) over time. In some cases, the ramp up or down function may be based on external conditions. For example, if it is dark, a ramp up may be initiated. Blinking, lighting patterns, and/or color changes may indicate specific conditions or operation modes related to respective different ones of the light indicators 132, or to the operation of the ignition interface 80 in general.

The ignition interface 80 may have multiple modes of operation that impact the functioning of the ignition system 100 and various other components of the riding lawn care vehicle 10. In an example embodiment, the ignition interface 80 may have an off or sleep mode, a wake-up mode, a ready to start or starting mode, and a running mode. The wake-up mode and the starting mode may generally be transient modes that are not allowed to be maintained for a long period of time. As such, the wake-up mode and the starting mode may each have time limits associated therewith such that if no activity is noted in each respective mode within a given period of time, the ignition interface 80 will be returned to one of the non-transient modes of operation (i.e., the sleep mode or the running mode). The sleep mode and the running mode are generally capable of continued and indefinite operation as long as other prerequisites to operation in such modes are met.

As shown in FIG. 3, a power button 210, a first key 220 a second key 230 and a third key 240 may each be examples of function buttons 134. The function buttons 134 may be any kind of pushbutton, press button, or the like. Thus, the function buttons 134 may be flush-mounted or may extend outward from the panel face 200. Actuation of the function buttons 134 may initiate a changing of a switch position or an indication to the processing circuitry 110 to indicate that a corresponding function button 134 has been actuated. In some cases, the function buttons 134 may be biased switches that return to their original position after each actuation thereof. Thus, a most recent position or current status of the function buttons 134 may be maintained within the processing circuitry 110, and the processing circuitry 110 may also interface with other appropriate devices to actuate the functionality associated with any one of the function buttons 134 that is actuated and/or to turn on any light indicators 132 or other display indications that are appropriate to indicate the status of a device impacted by operation of one of the function buttons 134.

Meanwhile, a first light 250, a second light 252, a third light 254, a fourth light 256, a fifth light 258, and a sixth light 260 may be examples of light indicators 234. In an example embodiment, the first light 250 may be associated with the power button 210 and may indicate engine status and/or ignition interface 80 mode of operation. The first light 250 may be capable of showing different colors dependent upon the mode of operation of the ignition interface 80. The first light 250 may also blink according to specific patterns that indicate receipt of information or a mode of operation.

The second light 252 may be a parking brake indicator light that is lit when the parking brake is or is not set, depending on the current mode. For example, when a fault associated with the parking brake is detected, the second light 252 may be lit. As such, if setting of the parking brake is a precondition for engine starting, and the parking brake is not set, the second light 252 may be lit and may clear when the parking brake is set. The second light 252 may also be lit in instances where all lights, or combinations of lights, are lit to indicate certain faults. The third light 254 may be a PTO engagement indicator light that is lit when the PTO is engaged and off when the PTO is not engaged. The second and third lights 252 and 254 may not be specifically or physically associated with any one of the function buttons 134.

The fourth light 256 may be a battery light that indicates a status of the battery unit 162 when lit. For example, the fourth light 256 may be lit whenever battery level is low. In some embodiments, pressing the fourth light 256 may present an inquiry as to charge status of the battery. The fourth light 256 may present a color or a blink pattern to indicate current state of charge of the battery. The fourth light 256 may be disposed on the first key 220.

The fifth light 258 may be a headlight indicator light that is lit when the headlights 168 are energized and off when they are not energized. In some embodiments, the headlights may ramp up to full brightness over time when they are energized, and may ramp down to being off when they are de-energized. The headlights may stay on for a delay period after engine shutdown if the operator does not manually turn them off using the second key 230. If the headlights are turned on without the engine running, they may automatically shutoff after a specified period of time (e.g., two minutes). In some embodiments, if the engine is not running, the operator may be required to enter a valid code to turn on the headlights. However, if the headlights turn off after the automatic shutoff period, the operator may have a relatively short window of time during which the lights may be turned back on without reentry of the code. In some cases, the fifth light 258 may also light to indicate faults associated with the headlights (e.g., one or more burned out bulbs). The fifth light 258 may be disposed on the second key 230.

The sixth light 260 may be a mow-in-reverse (MIR) indicator light that is lit when MIR is activated and off when MIR is not activated. However, in some embodiments, the sixth light 260 may be used to indicate whether steering handles are in the park position. The sixth light 260 may light or blink to indicate various fault conditions associated with MIR or with the position of steering handles. In some cases, the sixth light 260 may have an amber color. The sixth light 260 may be disposed on the third key 240.

In an example embodiment in which the first, second, and third keys 220, 230, and 240 each have a corresponding light indicator associated therewith (e.g., fourth light 256, fifth light 258, and sixth light 260), the corresponding light indicators may be associated with one of the functional operations that the respective keys are capable of initiating in at least one operating mode of the ignition interface 80. However, since the first, second, and third keys 220, 230, and 240 may have multiple functions (i.e., different functions in different modes) and one such function may be code entry, in some embodiments, a code value or number associated with each respective one of the first, second, and third keys 220, 230, and 240 may be indicated on or proximate to each key. Thus, for example, if a valid starting code is "1-3-2," the operator may be enabled to correlate the value "1" with the first key 220, and correlate the value "3" with the third key 240, while correlating the value "2" with the second key 230. The operator may then enter each key actuation in sequence to unlock the functionality of the power button 210 for engine startup. In other words, the code entry keys may enter the code for shifting from wake-up mode to starting mode.

Figure 4:
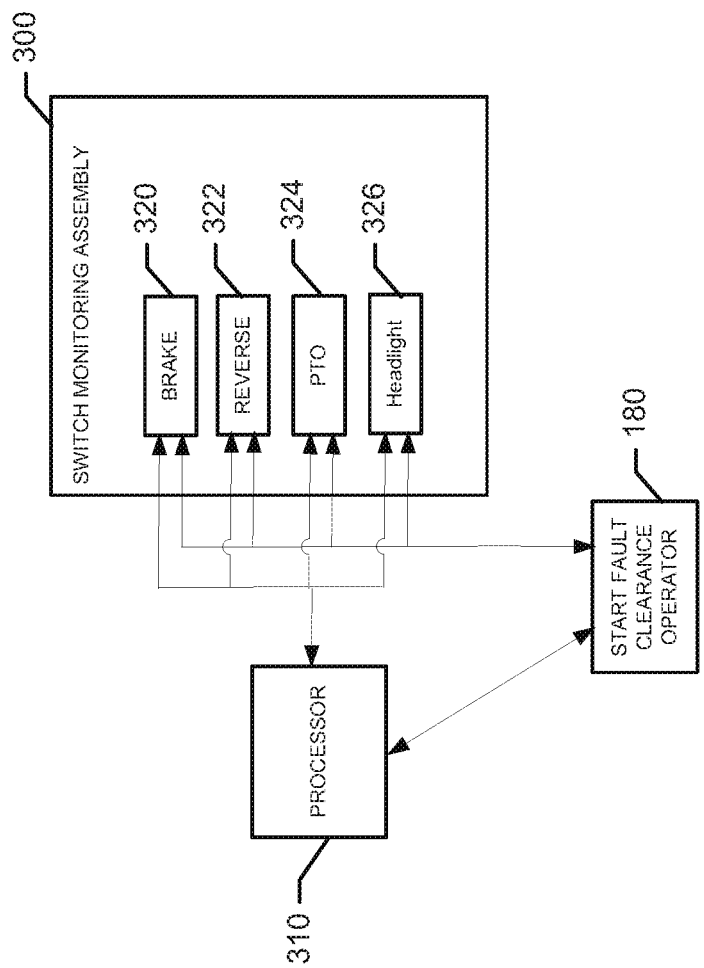
FIG. 4 illustrates a block diagram of an example of a switch monitoring assembly according to an example embodiment.

FIG. 4 illustrates a block diagram of an example of a switch monitoring assembly 300 that may facilitate operation of the start fault clearance operator 180 according to an example embodiment. It should be appreciated that the switch monitoring assembly 300 may interface with a processor 310 or processing circuitry. Thus, for example, various control operations described herein relative to the switch monitoring assembly 300 may be executed by or in association with the processor 310, which may be the processor 112 of FIG. 2. As such, for example, at least some of the functions attributable to the switch monitoring assembly 300 (and/or components thereof) may be carried out with, by or otherwise instructed under control of the processor 310. The processor 310 may therefore provide the hardware for hosting software to configure the system for control and implementation of monitoring and/or control techniques consistent with example embodiments.

In an example embodiment, the processor 310 may be configured to interface with various modules of the switch monitoring assembly 300 in a selective manner to enable the processor 310 to monitor switch positions or sensor conditions to determine the state of various components of the device that employs the switch monitoring assembly 300. According to this example, the modules may include, for example, a brake module 320, a reverse module 322, a PTO module 324, a headlight module 326, and/or the like. It should be appreciated, however, that more or fewer modules may be used in some embodiments. Moreover, some of the modules listed above may be replaced, eliminated, or further augmented in some cases dependent upon the type of device upon which the switch monitoring assembly 300 and the start fault clearance operator 180 is employed. For example, if a mower with zero turn steering levers is employed, the reverse module 322 may be replaced with sensors for monitoring left and right side turn lever position (inboard/outboard).

The brake module 320 may include a circuit configured to monitor brake status. Thus, for example, if the parking brake should be set before engine ignition is permitted, the switch monitoring assembly 300 can determine whether the brake module 320 indicates that the parking brake is set and communicate the same to the processor 310. The processor 310 may then employ logic to prevent engine ignition if the parking brake is not set. However, if the parking brake is not set, ignition may be prevented (e.g., by not starting the engine responsive to pushing the power button 210) and the first light 250 may flash or otherwise indicate a start fault. By pressing the start fault clearance operator 180, the user may communicate a desire to correct the start fault, and the parking brake may be set by interaction with the brake module 320. In some cases, the processor 310 may direct switch repositioning to clear the start fault.

The reverse module 322 may be configured to monitor the status of the engine and/or the blades relative to operating in reverse. Thus, for example, if selection of the mow-in-reverse function is prohibited for engine starting, the switch monitoring assembly 300 can determine whether the reverse module 322 indicates mow-in-reverse is selected and communicate the same to the processor 310. The processor 310 may then employ logic to prevent engine ignition while mow-in-reverse is selected. Thus, if the mow-in-reverse is not selected, ignition may be allowed. But, if mow-in-reverse is selected, ignition may be prevented (e.g., by not starting the engine responsive to pushing the power button 210) and the sixth light 260 may flash or otherwise indicate a start fault related to mow-in-reverse functionality. By pressing the start fault clearance operator 180, the user may communicate a desire to correct the start fault, and the mow-in-reverse function may be de-activated by interaction with the reverse module 322. In some cases, the processor 310 may direct switch repositioning to clear the start fault.

The PTO module 324 may be configured to monitor whether the PTO is on or off. Thus, for example, if activation of the PTO is prohibited for engine starting, the switch monitoring assembly 300 can determine whether the PTO module 324 indicates mow-in-reverse is selected and communicate the same to the processor 310. The processor 310 may then employ logic to prevent engine ignition while PTO is activated. Thus, if the PTO is not activated, ignition may be allowed. But, if the PTO is activated, ignition may be prevented (e.g., by not starting the engine responsive to pushing the power button 210) and the third light 254 may flash or otherwise indicate a start fault related to PTO functionality. By pressing the start fault clearance operator 180, the user may communicate a desire to correct the start fault, and the PTO may be de-activated by interaction with the PTO module 324. In some cases, the processor 310 may direct switch repositioning to clear the start fault.

The headlight module 326 may be configured to monitor whether the headlights are on or off. Thus, for example, if headlight activation is prohibited (or required) for engine starting, the switch monitoring assembly 300 can determine whether the headlight module 326 indicates that the headlights are on and communicate the same to the processor 310. The processor 310 may then employ logic to prevent (or enable) engine ignition while the headlights are on. Thus, if the headlight module 326 indicates an impermissible state of the headlights for enabling ignition, ignition may be prevented (e.g., by not starting the engine responsive to pushing the power button 210) and the fifth light 258 may flash or otherwise indicate a start fault related to headlight functionality. By pressing the start fault clearance operator 180, the user may communicate a desire to correct the start fault, and the headlights may be turned on or off by interaction with the headlight module 326. In some cases, the processor 310 may direct switch repositioning to clear the start fault.

In an example embodiment, the various modules may be connected to respective different pins of the processor 310. The processor 310 may selectively monitor each of the modules in accordance with a cyclical monitoring process either in parallel or in series responsive to an ignition attempt. If the ignition fails due to any of the reasons mentioned above as possible ignition prevention scenarios, the failure may be individually indicated as mentioned above. The user could then just actuate the start fault clearance operator 180 to correct any and every start fault condition with a single action.

In some examples, the user may not necessarily need to have a start fault indicated first to use the start fault clearance operator 180. Thus, for example, the user may actuate the start fault clearance operator 180 before attempting to initiate ignition to ensure that any binary start fault operators are set to the proper position to permit a start of the engine. As such, the start fault clearance operator 180 may be used to facilitate placing the ignition system 100 in a condition to ensure that start faults are clear even before attempting to start the engine. Although not required, in some cases, the ignition system 100 may be configured to provide an indication (e.g., via the light indicators 132) as to which ones of the binary start fault operators have been adjusted responsive to operation of the start fault clearance operator 180 (e.g., by lighting a light indicator (or flashing the same) for any adjusted switch position).

Example embodiments may therefore enable the monitoring states of certain safety-related switches or other binary start fault operators in order to ensure that a start enabling status is set for each such switch. If the start enabling status is not set for any of the switches, then a single operation may reposition each of the switches to thereafter enable starting.

Figure 5:
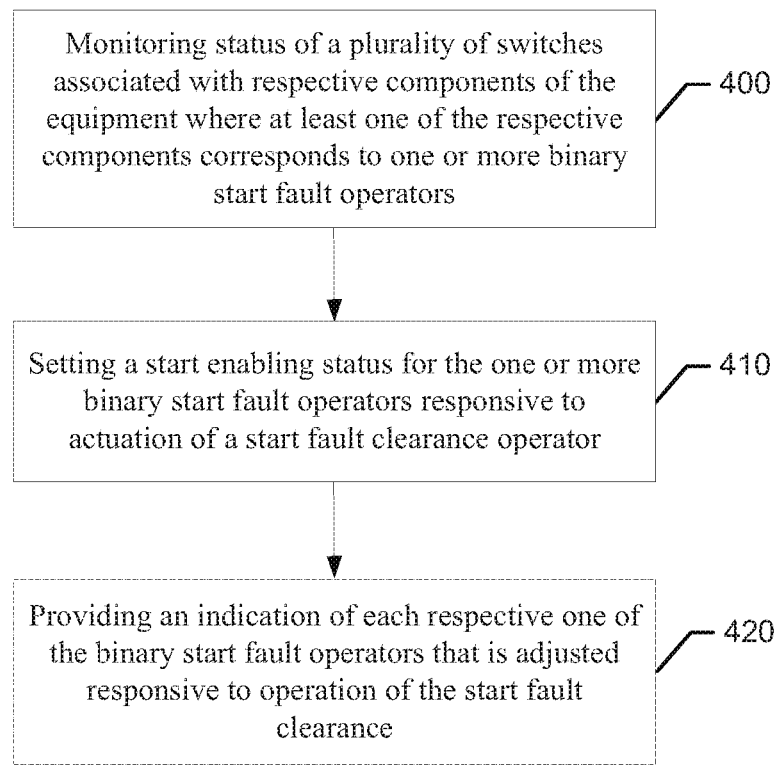
FIG. 5 illustrates a block diagram of a method according to an example embodiment.

In some cases, a method of enabling operation of an ignition system for outdoor power equipment may be provided. The method, which is shown in FIG. 5, may include monitoring status of a plurality of switches associated with respective components of the equipment where at least one of the respective components corresponds to one or more binary start fault operators at operation 400, and setting a start enabling status for the one or more binary start fault operators responsive to actuation of a start fault clearance operator at operation 410. The method may further include an optional operation including providing an indication of each respective one of the binary start fault operators that is adjusted responsive to operation of the start fault clearance operator at operation 420. The control algorithm may include at least a portion of its contents dedicated to performing some or all of the operations of FIG. 5 either alone or in combination with other executable instructions that the control algorithm may be capable of executing.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:
1. Outdoor power equipment comprising:
an engine to selectively power the equipment;
an ignition system comprising a processor configured to enable selective powering of the engine based at least in part on a position of a first binary start fault operator and a second binary start fault operator;

a switch monitoring assembly configured to enable the processor to monitor status of a plurality of switches associated with a first component and a second component of the equipment, the first component corresponding to the first binary start fault operator and the second component corresponding to the second binary start fault operator; and a start fault clearance operator configured to, responsive to only a single action actuation of the start fault clearance operator, automatically set a start enabling status for the first binary start fault operator and the second binary start fault operator.

2. The outdoor power equipment of claim 1, wherein the first or the second binary start fault operator comprises a headlight module, a reverse module, a power take-off (PTO) module or a brake module.

3. The outdoor power equipment of claim 1, wherein, responsive to a failed attempt to operate the ignition system to start the engine, the start fault clearance operator is selectable to set the first and the second binary start fault operator and at least a third binary start fault operator to the start enabling status.

4. The outdoor power equipment of claim 1, wherein, prior to an attempt to operate the ignition system to start the engine, the start fault clearance operator is selectable to set the first and the second binary operator and at least a third binary start fault operator to the start enabling status.

5. The outdoor power equipment of claim 1, wherein the ignition system is configured to provide an indication of each respective one of the first and the second binary start fault operator that is adjusted responsive to operation of the start fault clearance operator.

6. The outdoor power equipment of claim 1, wherein the outdoor power equipment comprises a riding lawn care device or a walk-behind lawn care device.

7. The outdoor power equipment of claim 1, wherein the outdoor power equipment comprises hand-held power equipment.

8. An ignition system for outdoor power equipment comprising an engine to selectively power the equipment, the ignition system comprising:

a processor configured to enable selective powering of the engine based at least in part on a position of a first binary start fault operator and a second binary start fault operator;

a switch monitoring assembly configured to enable the processor to monitor status of a plurality of switches associated with a first component and a second component of the equipment, the first component corresponding to the first binary start fault operator and the second component corresponding to the second binary start fault operator; and a start fault clearance operator configured to, responsive to only a single action actuation of the start fault clearance operator, automatically set a start enabling status for the first binary start fault operator and the second binary start fault operator.

9. The ignition system of claim 8, wherein the first or the second binary start fault operator comprises a headlight module, a reverse module, a power take-off (PTO) module or a brake module.

10. The ignition system of claim 8, wherein, responsive to a failed attempt to operate the ignition system to start the engine, the start fault clearance operator is selectable to set the first and the second binary start fault operator and at least a third binary start fault operator to the start enabling status.

11. The ignition system of claim 8, wherein, prior to an attempt to operate the ignition system to start the engine, the start fault clearance operator is selectable to set the first and the second binary start fault operator and at least a third binary start fault operator to the start enabling status.

12. The ignition system of claim 8, wherein the ignition system is configured to provide an indication of each respective one of the first and the second binary start fault operator that is adjusted responsive to operation of the start fault clearance operator.

13. The ignition system of claim 8, wherein the outdoor power equipment comprises a riding lawn care device, hand-held power equipment, or a walk-behind lawn care device.

14. A method of enabling operation of an ignition system for outdoor power equipment, the method comprising:

monitoring status of a plurality of switches associated with a first component and a second component of the equipment, the first component corresponding to a first binary start fault operator and the second component corresponding to a second binary start fault operator; and responsive to only a single action actuation of a start fault clearance operator, automatically setting a start enabling status for the first binary start fault operator and the second binary start fault operator.

15. The method of claim 14, further comprising providing an indication of each respective one of the first and the second binary fault operator that is adjusted responsive to operation of the start fault clearance operator.

16. The method of claim 14, wherein, responsive to a failed attempt to operate the ignition system to start an engine of the equipment, the start fault clearance operator is selectable to set the first and the second binary fault operator and at least a third binary start fault operator to the start enabling status.

17. The method of claim 14, wherein, prior to an attempt to operate the ignition system to start an engine of the equipment, the start fault clearance operator is selectable to set the first and the second binary fault operator and at least a third binary start fault operator to the start enabling status.

* * * * *